INVENTOR.
EDWIN R. HIRT
BY
Bialos & Schlemmer
ATTORNEYS

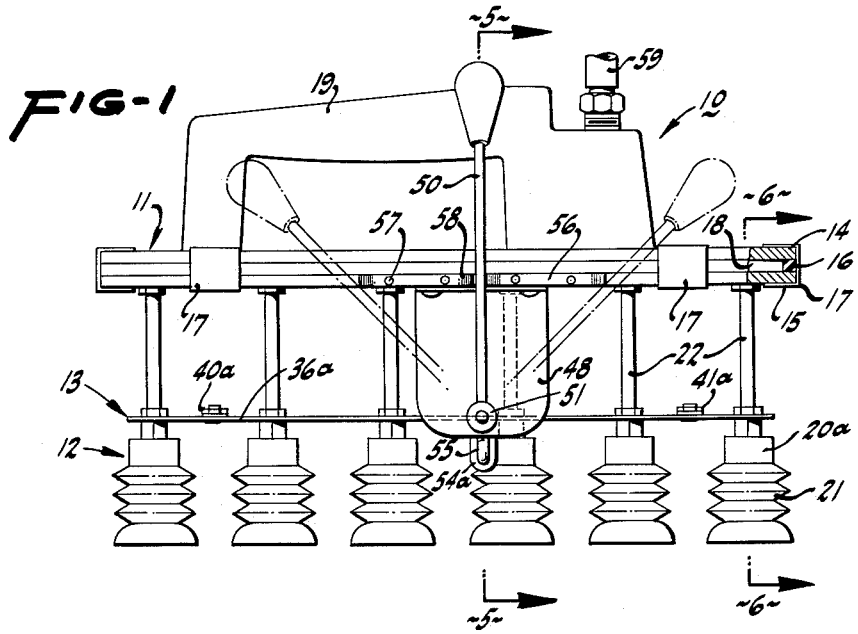
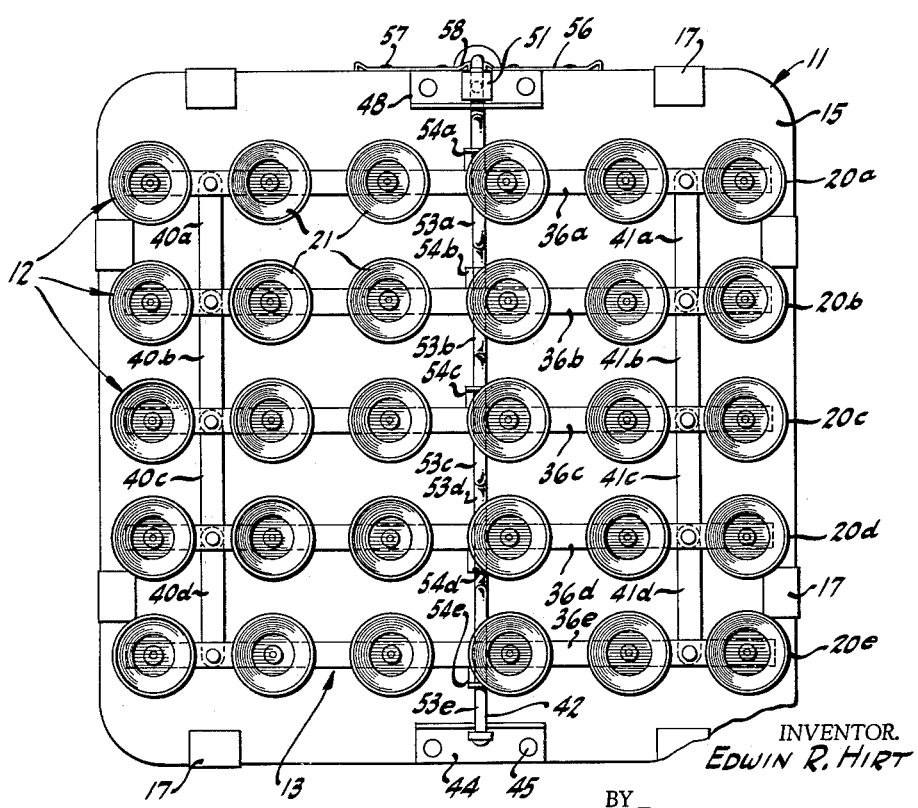

Jan. 18, 1966   E. R. HIRT   3,230,001
ARTICLE LIFTING DEVICE
Filed Nov. 22, 1961   3 Sheets-Sheet 3

INVENTOR.
EDWIN R. HIRT
BY
Bialos & Schlemmer
ATTORNEYS

United States Patent Office 3,230,001
Patented Jan. 18, 1966

3,230,001
ARTICLE LIFTING DEVICE
Edwin R. Hirt, Orinda, Calif., assignor to Food Systems, Inc., Berkeley, Calif., a corporation of California
Filed Nov. 22, 1961, Ser. No. 154,203
7 Claims. (Cl. 294—64)

This application is a continuation-in-part of application Serial No. 45,214 filed July 25, 1960, which has matured into Patent No. 3,061,352.

This invention relates to a device for lifting articles arranged in a particular pattern and for repositioning such articles in another particular pattern; and it is more especially concerned with a device for individually engaging and lifting each one of a plurality of articles oriented in a predetermined pattern and for repositioning such articles in a different predetermined pattern at the same or at a different location. An example of an environmental use for the device is in the handling of eggs.

In my above-mentioned copending application, a device is disclosed for lifting and removing articles such as eggs from a crate or other container in which they are arranged in a particular pattern or orientation, and for depositing such articles in the same predetermined pattern at the same or at another location. However, in many instances, it is desirable and frequently necessary to alter the orientation or pattern of the articles before they are redeposited; and this is especially true in the handling of eggs when the relocation thereof is from a shipping container to an incubator tray.

In this latter instance, the eggs when in such container are arranged in separated layers, each of which comprises a plurality of aligned transversely spaced, longitudinally extending rows and a plurality of aligned longitudinally spaced, transversely extending rows—each layer usually totaling 30, 36 or 48 eggs separated from each other by dividers. The incubator trays, however, are designed to receive eggs in which each longitudinally extending row is offset in the longitudinal direction with respect to those adjacent thereto rather than being aligned therewith, and in which the spacing between the longitudinally extending rows is less than the corresponding spacing thereof in the container. The advantage of having a device useful with eggs for lifting the same from a crate or container and for repositioning them on an incubator tray in a different pattern or orientation has been recognized, and various mechanisms for accomplishing this purpose have been proposed. However, all such mechanisms, so far as is known, are complex and, therefore, necessarily cumbersome.

In view of this, an object of the present invention is to provide a device for lifting a plurality of articles, such as eggs, which are oriented in one particular pattern and for repositioning such articles in a different predetermined pattern, but which is simple in structure and function, light-weight and convenient to handle, and which is readily manipulated and controlled to shift the article orientation from one pattern to another.

Another object of the invention is in the provision of an article lifting device of the character described having a plurality of lifting assemblies each of which includes an article engaging structure and a flexible support therefor which floatingly secures the structure to a frame or carrier and at the same time permits free relative movement of the article engaging structure with respect to the carrier.

Still another object is that of providing an article lifting device of the type described, in which the flexible supports respectively provide the means for connecting the associated article lifting structures with a control equipped power source operative to energize the structures in their article lifting function.

A further object of the invention is to provide a device of the character described having a shiftable linkage composition interconnecting the various article lifting assemblies for effecting relative movement therebetween selectively into one or the other of the predetermined article patterns.

Still a further object is in the provision of a device as described having a plurality of article lifting assemblies arranged in longitudinally extending rows, and in which the shiftable linkage composition is operative to displace such rows longitudinally with respect to each other and to shift the rows transversely to alter the spacing therebetween so as to change the orientation of such assemblies from one predetermined pattern to another.

Yet a further object of the invention is that of providing a device of the type set forth wherein the linkage composition is equipped with an actuator and is operable to simultaneously shift adjacent longitudinally extending rows of lifting assemblies in opposite longitudinal directions, and at the same time change the spacing therebetween, with the result that the extent of movement required by the actuator and linkage composition to change the pattern of articles raised by the lifting assemblies is substantially minimized.

Additional objects and advantages of the invention will become apparent as the specification develops.

A specific embodiment of the invention is illustrated in the accompanying drawings, in which—

FIGURE 1 is a side view in elevation of a device embodying the invention (a portion of such device being shown in section), and in which the article lifting assemblies are oriented to correspond to one predetermined article pattern;

FIGURE 2 is a bottom plan view of the device illustrating the orientation of the article lifting assemblies corresponding to that of FIGURE 1;

Figure 3:
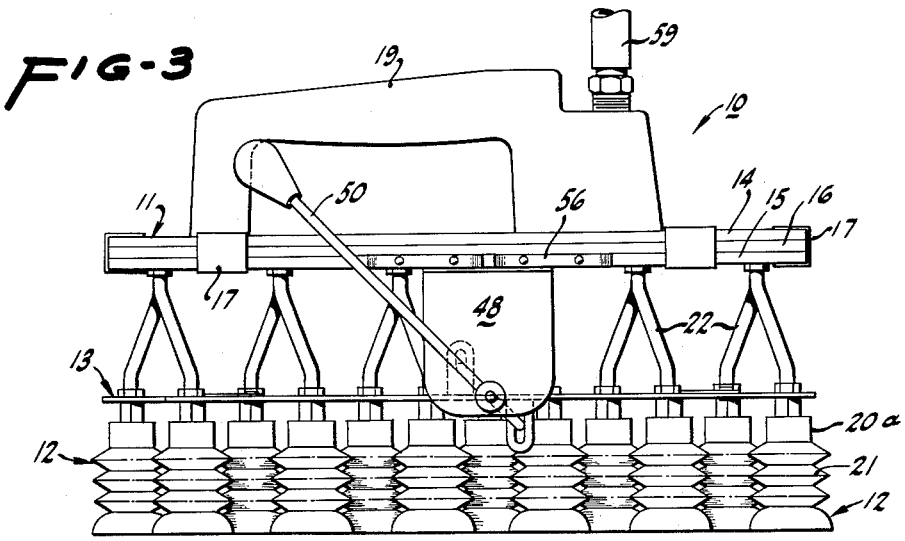
FIGURE 3 is a side view in elevation similar to that of FIGURE 1, but in which the lifting assemblies have been sifted into another predetermined article pattern.

The exemplary article lifting device shown in the drawings is designated in its entirety with the numeral 10, and comprises in general a frame or carrier 11, a plurality of lifting assemblies 12, and a linkage composition 13 for shifting the assemblies 12 from one orientation corresponding to a particular or predetermined article pattern to another orientation corresponding to a different predetermined article pattern. The carrier 11 includes a pair of generally planar plates 14 and 15 of substantially identical configuration which are vertically spaced and have a gasket or seal member 16 disposed therebetween along the perimetric edges thereof. The plates 14 and 15 are secured in engagement with the seal member 16 by a plurality of spring clamps 17 of generally U-shaped configuration, each having a pair of legs that respectively bear against the plates 14 and 15 to urge the same into sealing engagement with the member 16. Preferably, the plates 14 and 15 are formed of a light-weight transparent material such as plexiglass, and the seal 16 is desirably a synthetic rubber composition such as neoprene which is oil-resistant.

The plates 14 and 15 in conjunction with the seal 16 define a chamber 18, and access to such chamber for cleaning purposes is afforded by removal of the clamps 17. To facilitate reassembly of the carrier, the seal 16 may be adhesively secured to one or the other of the plates so that it remains precisely located with respect to such plate when the carrier is disassembled. The plate 14 has a handle 19 secured thereto by cap screws or other suitable means to permit the device 10 to be lifted and otherwise manually manipulated.

The article lifting assemblies 12 in the specific embodiment shown total thirty in number, and they are oriented in five longitudinally extending and transversely spaced rows, each of which contains six longitudinally spaced assemblies. For purposes of identification, the longitudinally extending rows are respectively designated with the numerals 20a through 20e, inclusive. All of the assemblies 12 are substantially identical, and referring particularly to FIGURE 6, it will be seen that each lifting assembly comprises an article engaging structure 21 and a flexible support 22 therefor. The device illustrated is especially useful for handling eggs, and effects lifting of such eggs by means of vacuum applied thereto. Therefore, the article engaging structure 21 is in the form of a resilient rubber cup 23 connected by a compressible bellows 24, formed integrally therewith, to a connector block 25 which is integral with the bellows. The block 25 has a centrally disposed opening therethrough that receives a coupling 26 having a restricted intermediate portion projecting through the opening in the connector block 25, and the block is held in place on the coupling by upper and lower shoulders 27 and 28 that bear against the block 25.

The coupling 26 has a flow passage 29 extending longitudinally therethrough that communicates at one end with the interior of the structure 21 and at the other end thereof with the passageway through the flexible support 22, which is in the form of a rubber tube or conduit. One end of the conduit 22 telescopically receives the upper end portion of the coupling 26 and resiliently grips the same to define a substantially airtight connection therewith. The other end of the conduit 22 telescopically receives the end portion 30 of a fitting 31 and resiliently grips the same to form a substantially air-tight connection therewith. The fitting 31 has a threaded end portion 32 that extends upwardly through an opening provided therefor in the lower plate 15 of the carrier 11, and is held in position by a nut 33 that engages the threaded end 32 of the fitting and draws a laterally extending flange 34 provided thereby upwardly against the lower surface of the plate 15. The fitting 31 has a passage 35 extending therethrough which establishes communication between the conduit 22 and chamber 18 of the carrier and, consequently, between the carrier chamber and the interior of the article engaging structure 21.

The structural composition of each of the article lifting assemblies 12 disposes the same in depending relation with the carrier 11, and the flexible tubes or supports 22 resiliently and floatingly support the article engaging structures 21 below the carrier 11. Thus, each of the various article lifting assemblies is individually secured to the carrier 11 and is separately supported thereby independently of the other assemblies; and one or more of such assemblies may be shifted or displaced relative to the others in substantially all directions, and in particular in both the transverse and longitudinal directions.

Figure 4:
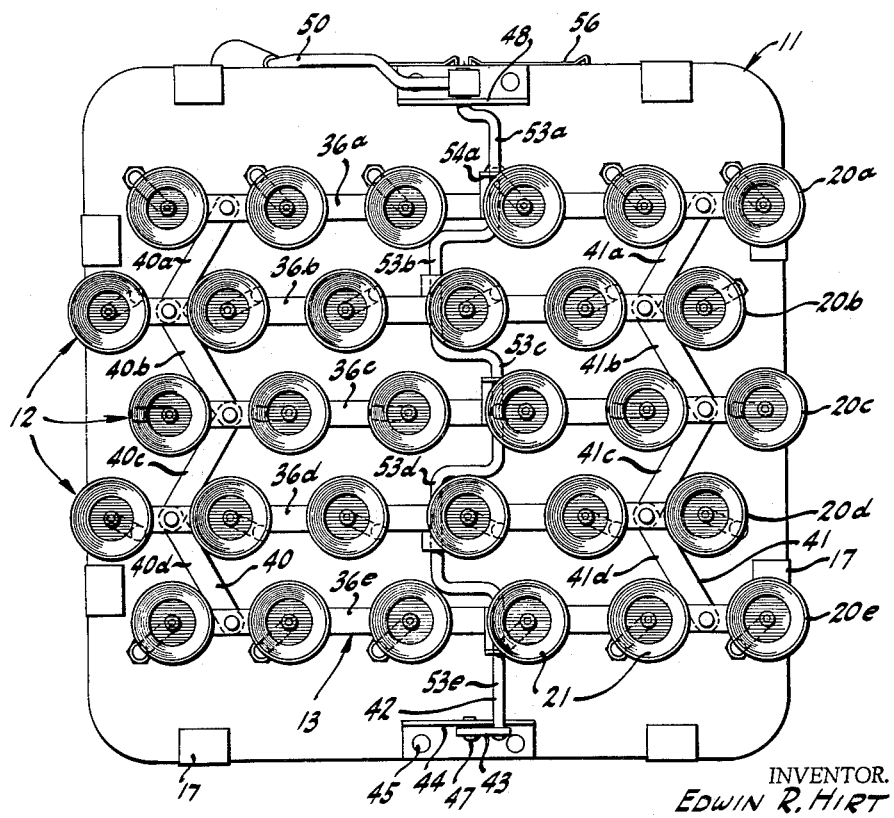
FIGURE 4 is a bottom plan view similar to that of FIGURE 2, but in which the article lifting assemblies are oriented to correspond to the alternate article pattern shown in FIGURE 3.
Figure 6:
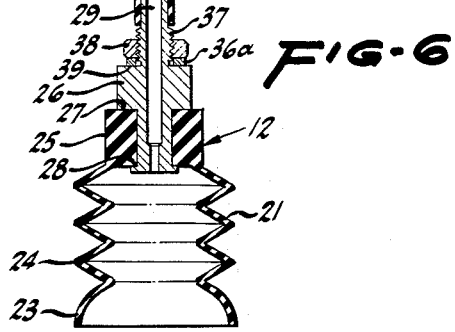
FIGURE 6 is a broken vertical sectional view taken along the plane 6—6 of FIGURE 1.

The linkage composition 13 comprises a group of longitudinal-positioning links and a group of transverse-positioning links; and as shown most clearly in FIGURES 2 and 4, the first group includes a plurality of longitudinally extending links respectively associated with the longitudinally extending rows 20a through 20e of the lifting assemblies, and for identification, these links are respectively designated with the numerals 36a through 36e. Each of the links 36 is an elongated rigid member that is relatively thin, is substantially planar, and is provided with a plurality of longitudinally spaced openings therethrough respectively aligned with the lifting assemblies in the associated row. As shown in FIGURE 6, the upper end portion 37 of each coupling 26 extends through the aligned opening in the associated link 36, and the link is anchored thereto by means of a nut 38 that is threadedly received by the end portion 37 and bears downwardly against the link to confine the same against a shoulder 39 provided by the coupling. Thus, each of the longitudinally extending links is connected to each of the article lifting structures in the associated row of article lifting assemblies.

The second group of links in the linkage composition 13 includes a plurality of transversely extending links arranged in longitudinally spaced units 40 and 41. In the specific embodiment, the unit 40 is comprised of four individual links or link segments respectively denoted with the numerals 40a through 40d, each of which extends between two adjacent longitudinally extending links and is pivotally connected to each. In specific terms, the link 40a is pivotally connected by suitable pivot pins to the links 36a and 36b, the line 40b is pivotally connected to the longitudinal links 36b and 36c, and so forth. The unit 41 is similarly comprised of links 41a through 41d, each of which is pivotally connected to a pair of adjacent longitudinal links.

An acuator is provided for shifting the linkage composition to change the pattern of the lifting structures 21, and the actuator in the present device is in the form of a crank 42 centrally disposed with respect to the device and extending transversely thereacross. At one end, the crank 42 is equipped with an arm 43 substantially normal to the longitudinal axis of the crank; and the arm 43 is pivotally supported by a bracket 44 secured by cap screws 45 or other suitable means to the lower plate 15 of the carrier 11. Such pivotal support for the arm and crank may be provided in an appropriate manner, such as by means of a bearing 46 extending outwardly from the arm along the longitudinal axis of the crank and which projects through an opening provided therefor in the bracket 44. A pin arrangement 47 can be used to retain the bearing within the bracket opening.

At its other end, the crank 42 is pivotally supported by a bracket 48 through which it extends, and the bracket is secured to the underside of the plate 15 by cap screws 49. Releasably anchored to the end of the crank which is adjacent the bracket 48 is a handle 50 equipped with a collar 51 telescopically receiving the crank end, and the collar is locked on the crank end to prevent relative rotational movement therebetween by a set screw 52. The handle 50 extends upwardly above the carrier 11 to provide a hand grip that may be readily grasped to pivot the crank and shift the linkage, as will be described hereinafter.

The crank 42 intermediate the transversely spaced ends thereof is provided with a plurality of throws or portions offset from the rotational axis of the crank. As seen best in FIGURE 4, a throw is provided for each of the longitudinal rows 20a through 20e of the lifting assemblies, and for identification the throws are respectively denoted with the numerals 53a through 53e. The throws alternately project in opposite directions; and thus, the throws 53a, 53c and 53e extend in the same direction (or toward the right as viewed in FIGURE 4), while the throws 53b and 53d extend in the opposite direction, or are angularly spaced therefrom by 180°.

Figure 5:
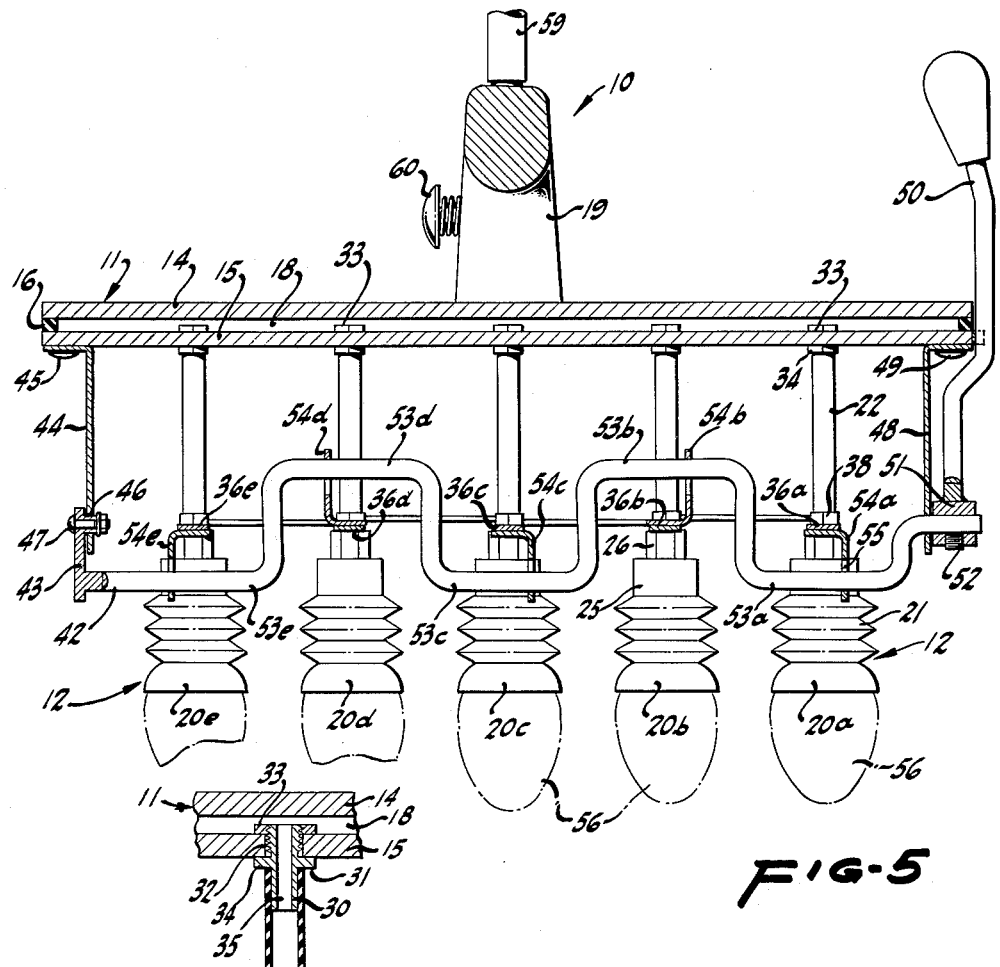
FIGURE 5 is a transverse vertical sectional view taken along the plane 5—5 of FIGURE 1.

The crank throws are respectively connected with the longitudinally extending links 36, and such connection is accomplished through slip connectors or hangers 54a through 54e. More particularly, as shown in FIGURE 5, the various connectors 54 have a generally L-shaped configuration, one leg of which is provided with an opening that receives the threaded upper end portion 37 of one of the lifting assemblies and is secured thereto by the nut 38 in the same manner that the longitudinally extending links are secured to the lifting assemblies. The other leg of each connector has an elongated opening 55 therein through which extends the associated throw of the crank 42; and to permit this type of interconnection, the adjacent connectors 54 are disposed in opposite directions—that is, the throw-connecting leg of the connector 54a extends in a direction away from the carrier 11, the corresponding leg of the connector 54b extends toward the carrier, and so on. The elongated throw-receiving openings 55 of the connectors permit limited movement of the throws in directions toward and away from the carrier 11 as the crank is rotated without displacing the connectors and lifting assemblies in these same directions, and the openings 55 must afford a sufficiently loose fit with the throws so that the connectors 54 can slide therealong as the crank is rotated.

As seen in FIGURE 1, the crank or actuator is movable from its central position in either direction through an angular distance of substantially 45°, or from the full-line showing of the handle 50 to either of the positions thereof illustrated by broken lines. Fastener or latch structure is included for cooperation with the handle 50; and in the form shown, such latch structure may be a spring clip or detent 56 extending in the longitudinal direction along one edge of the lower plate 15, and the clip may be secured thereto by cap screws 57 or other suitable means. The clip has a centrally disposed offset 58 defining a recess that receives the handle 50 in the central position thereof to releasably retain the same in such position; and at each of its ends, the clip may be offset to provide a stop that tends to releasably maintain the handle 50 in either of the alternate positions thereof indicated by broken lines in FIGURE 1.

Power means must be provided in order to energize the article lifting structures 21 in their lifting functions, and the device 10 is adapted to utilize a vacuum power source. Such vacuum source (not shown) may constitute a conventional system utilizing an ordinary vacuum pump, and this power source is connected directly to the various lifting structures 21 through the respectively associated conduits or flexible supports 22. More specifically, the power source is connected through a line 59 to a suitable passage provided through the handle 19 that communicates with the chamber 18 of the carrier 11. Control means 60 in the form of a manually operable valve controls the energization of the structures 21 for their lifting operations and specifically determines the presence or absence of a negative pressure in each of the cups 23. The copending patent application referred to hereinbefore may be consulted for a specific illustration and description of a valving and flow passage arrangement controlling the suction or negative pressure applied to the chamber 18.

In describing the operation of the device, it will be assumed that initially it is in the condition illustrated in FIGURES 1 and 2 in which the respectively corresponding end assemblies 12 of the longitudinally extending rows 20a through 20e are in transverse alignment. In this condition of the device, the handle 50 is centrally disposed and the orientation of the lifting assemblies 12 is appropriate for engaging eggs in the predetermined pattern thereof within a shipping crate or container. The conduit 59 will be connected to a suitable vacuum power source, and a workman will be in control of the device and can manipulate the same by means of the handle 19.

The device 10 will be moved into position above the uppermost layer of eggs within a crate thereof, and the device will be lowered to bring the lifting assemblies 12 (and more particularly, the article engaging structures 21 thereof) into engagement with such eggs, as shown diagrammatically in FIGURE 5—the broken lines depicting eggs 56. Since the control valve 60 is normally open and the power vacuum source is ordinarily connected with the cup structures 21 through the conduits 22 and chamber 18, the reduced pressure within the cups secures the eggs thereto. The eggs 56 are best gripped by the cup structures when end portions of the eggs are engaged thereby; however, since the cup structures are resilient and flexible, they are adapted to engage and lift eggs irrespective of the particular positions thereof. The bellows 24 of each assembly 12 will tend to compress under the influence of the reduced pressure therein; and as a consequence, the eggs will be elevated slightly toward the carrier 11. If further elevation is required, the workman simply raises the device 10 by lifting the handle 19 upwardly, and the device may be moved to a different location for redepositing eggs on an incubator tray.

The workman may now shift the actuator handle 50 either toward the right or toward the left, as viewed in FIGURE 1, to displace the longitudinally extending rows 20a through 20e with respect to each other and to shift such rows transversely into closer proximity. Assuming that the handle 50 is moved toward the left, as shown in FIGURE 3, the assemblies 12 will be disposed in the orientation illustrated in FIGURE 4, which is appropriate for depositing the eggs on an incubator tray. In the predetermined pattern of FIGURE 4, the transverse spacing between each of the rows has been reduced from that of the predetermined pattern shown in FIGURE 2, as is evident by observing that in FIGURE 4 such spacing is less than the length of the individual links 40 and 41; while in the configuration of FIGURE 2, the transverse spacing between the rows is equal to the length of the individual links 40 and 41. Effectively then, the rows 20a and 20b are shifted in one transverse direction toward the central row 20c, and the rows 20d and 20e are shifted in the opposite transverse direction toward the central row 20c.

This transverse shifting of the longitudinally extending rows is enforced thereon by the links 40 and 41 upon longitudinal displacements of the rows. More particularly, as the actuator handle 50 is swung from its central to a lateral position, the various throws 53 of the crank, which all lie in a plane normal to the carrier 11 when the handle 50 is in its central position, are rotated into a plane that defines an angle of approximately 45° with the plane of the carrier 11. This rotary movement of the throws displaces the alternate longitudinal rows in opposite directions; and as seen in FIGURE 4, the rows 20a, 20c and 20e are displaced toward the right, while the rows 20b and 20d are displaced toward the left. Such longitudinal displacements of the rows cause the various transverse links 40 and 41 to pivot about the pivotal connections thereof with the longitudinal links 36, and thereby draw the adjacent links 36 toward each other, and, more pointedly, toward the central row 20c. The elongated openings 55 in the connectors 54 permit the connectors to slide along the respectively associated throws 53 as the links 36 are shifted transversely, and the elongated openings also permit the throws to move through the relatively small vertical (that is, toward or away from the carrier 11) component of their rotary arcs which accompanies movement of the handle 50 between the central and lateral positions thereof.

After the assemblies 12 have been changed from the first to the alternate predetermined article pattern, the eggs 56 are moved into adjacency with the incubator tray or other receiving surface therefor and are released from the lifting structures 21 by manipulation of the control 60 to exhaust the chamber 18. The handle 50 is then moved into the central position thereof, and the device 10 returned to its prior location in preparation for another cycle of operation.

Throughout the entire operational cycle, each of the article engaging structures 21 is effectively supported by its associated conduit 22 independently of the other assemblies 12; and the flexible conduit 22 not only permits longitudinal and transverse movements of the structures 21 relative to each other and to the carrier 11, but further provides a resilient or cushioning connection thereof with the carrier which is advantageous in handling frangible articles such as eggs.

While in the foregoing specification a specific embodiment of the invention has been set forth in substantial detail for purposes of making a complete disclosure thereof, it will be apparent to those skilled in the art that numerous changes may be made in such details without departing from the spirit and scope of the invention.

I claim:

1. In a device for vacuum-lifting a plurality of eggs or the like arranged in a particular pattern and for repositioning such eggs in another particular pattern, a carrier provided with a chamber therein, at least two transversely spaced and longitudinally extending rows of longitudinally spaced egg-lifting assemblies each comprising an egg-engaging vacuum cup structure and a flexible support conduit therefor connecting the same to said carrier and floatingly supporting the cup structure therebelow, each of said flexible conduits being in open communication with said carrier chamber and with the respectively associated cup structures, a linkage composition including a pair of longitudinally extending positioning links respectively associated with said rows and being connected to each of the cup structures therein and including also a pair of transversely extending positioning links spaced longitudinally from each other and each transversely extending link being pivotally connected to each of said longitudinally extending links, said pair of longitudinally extending links and pair of transversely extending links being respectively operative to determine the relative longitudinal positions of said rows and relative transverse positions thereof in accordance with the aforesaid particular patterns, a selectively operable actuator crank having a pair of oppositely oriented throws respectively connected to said longitudinally extending links for simultaneously shifting the same in opposite longitudinal directions, and vacuum applying means connected with said chamber and therefore with each of said flexible conduits and being in communication therethrough with the respectively associated cup structures and including selectively operable control means for establishing the egg-lifting and egg-release conditions of said cup structures.

2. In a device for lifting a plurality of articles arranged in a particular pattern and for repositioning such articles in another particular pattern, a carrier, at least two transversely spaced and longitudinally extending rows of longitudinally spaced article lifting assemblies each comprising an article engaging structure and a flexible support therefor connecting the same to said carrier and floatingly supporting the article engaging structure therebelow, a linkage composition including a pair of longitudinally extending positioning links respectively associated with said rows and being connected with each of the article lifting assemblies therein and including also a pair of transversely extending positioning links spaced longitudinally from each other and each transversely extending link being pivotally connected to each of said longitudinally extending links, said pair of longitudinally extending links and pair of transversely extending links being respectively operative to determine the relative longitudinal positions of said rows and relative transverse positions thereof in accordance with the aforesaid particular patterns, and a selectively operable actuator connected with at least one of said links for displacing said longitudinally extending links both longitudinally and transversely with respect to each other.

3. The device of claim 2 in which said actuator is a manually operable crank having at least two oppositely oriented throws respectively connected to said longitudinally extending links to effect simultaneous displacements thereof.

4. The device of claim 2 in which each of said article engaging structures is a suction cup.

5. In a device for vacuum-lifting a plurality of eggs or the like arranged in a particular pattern and for repositioning such eggs in another particular pattern, a carrier, at least two transversely spaced and longitudinally extending rows of longitudinally spaced egg-lifting assemblies each comprising an egg-engaging vacuum cup structure and a flexible support conduit therefor connecting the same to said carrier and floatingly supporting the cup structure therebelow, a linkage composition including a pair of longitudinally extending positioning links respectively associated with said rows and being directly connected with each of the cup structures therein and including also a pair of transversely extending positioning links spaced longitudinally from each other and each transversely extending link being pivotally connected to each of said longitudinally extending links, said pair of longitudinally extending links and pair of transversely extending links being respectively operative to determine the relative longitudinal positions of said rows and relative transverse positions thereof in accordance with the aforesaid particular patterns, and an actuator connected with at least one of said longitudinally extending positioning links for selectively displacing the same longitudinally with respect to the other and thereby shift said transversely extending links to change the relative transverse position of said rows.

6. The device of claim 5 in which said actuator is connected to each of said longitudinally extending links for simultaneously shifting the same in opposite longitudinal directions.

7. The device of claim 5 in which said actuator is a manually operable crank having at least two oppositely oriented throws respectively connected to said longitudinally extending links to effect the aforesaid simultaneous shifting thereof.

References Cited by the Examiner
UNITED STATES PATENTS

| | | | |
|---|---|---|---|
| 2,903,290 | 9/1959 | Morris et al. | 294—65 |
| 3,062,578 | 11/1962 | Bushong | 294—65 |

GERALD M. FORLENZA, *Primary Examiner.*

JAMES S. SHANK, SAMUEL F. COLEMAN,
*Examiners.*